(12) United States Patent
Alford, Jr. et al.

(10) Patent No.: US 7,644,892 B1
(45) Date of Patent: Jan. 12, 2010

(54) BLENDED WINGLET

(76) Inventors: Lionel D. Alford, Jr., 1704 N. Cypress, Wichita, KS (US) 67206; Gary J. Clayman, Jr., 831 Hodapp Ave., Dayton, OH (US) 45410

( * ) Notice: Subject to any disclaimer, the term of this patent is extended or adjusted under 35 U.S.C. 154(b) by 57 days.

(21) Appl. No.: 11/481,571

(22) Filed: Jul. 6, 2006

(51) Int. Cl.
*B64C 23/06* (2006.01)
(52) U.S. Cl. .................. 244/199.4; 244/130; 244/35 R; 244/123.1
(58) Field of Classification Search .............. 244/123.1, 244/199.4, 130, 91, 90 B, 124, 199.2, 199.1, 244/198, 45 R, 45 A, 35 R, 218, 129.1, 34 A, 244/49; 446/62, 61, 66, 34, 57; 416/242, 416/243, 228, 235, 236, 237; D12/321, 331, D12/332, 343, 345; *B64C 23/06, 3/10, 3/58, B64C 39/06*
See application file for complete search history.

(56) References Cited

U.S. PATENT DOCUMENTS

| | | | | |
|---|---|---|---|---|
| 994,968 | A * | 6/1911 | Barbaudy | .................. 244/35 R |
| 1,050,222 | A | 1/1913 | McIntosh | |
| 1,050,654 | A * | 1/1913 | Holland | .................... 244/35 R |
| 1,841,921 | A | 1/1932 | Spiegel | |
| 1,939,682 | A | 12/1933 | Fleming | |
| 2,194,596 | A * | 3/1940 | Henter | ........................ 244/13 |
| 2,576,294 | A | 11/1951 | Geraci | |
| 2,576,981 | A | 12/1951 | Vogt | |
| 2,775,419 | A | 12/1956 | Hlobil | |
| 2,805,830 | A | 9/1957 | Zborowski | |
| 2,846,165 | A | 8/1958 | Axelson | |
| 3,270,988 | A | 9/1966 | Cone | |
| 3,834,654 | A | 9/1974 | Miranda | |
| 4,050,397 | A | 9/1977 | Vanderleest | |
| 4,146,199 | A | 3/1979 | Wenzel | |
| 4,365,773 | A | 12/1982 | Wolkovitch | |
| 4,382,569 | A * | 5/1983 | Boppe et al. | ............. 244/199.4 |
| 4,390,150 | A | 6/1983 | Whitener | |
| 4,541,593 | A | 9/1985 | Cabrol | |
| 4,714,215 | A | 12/1987 | Jupp et al. | |
| 4,856,736 | A | 8/1989 | Adkins et al. | |
| 4,865,275 | A | 9/1989 | Thompson | |
| 4,899,954 | A | 2/1990 | Pruszenski, Jr. | |

(Continued)

FOREIGN PATENT DOCUMENTS

WO   WO 0001580 A1 *   1/2000

OTHER PUBLICATIONS

Unferverth, Hans-Jurgen. "Goshawk" and "Projekct 42" (C-wings I and III) designs, available online since at least Jul. 1, 2005 accessed online on Oct. 28, 2008 at http://web.archive.org/web/20050701024226/http://www.aerodesign.de/.*

(Continued)

*Primary Examiner*—Michael R Mansen
*Assistant Examiner*—Richard R Green
(74) *Attorney, Agent, or Firm*—William F. Bahret

(57) ABSTRACT

A capped winglet comprising a helical portion having a smooth vertical curvature of 180°±approximately 20° from the plane of the unbounded end of a wing, and a generally planar cap contiguous with the helical portion of the winglet at the end of its curvature away from the wing, the cap having a free inboard end and a chord tapered toward the free end.

34 Claims, 4 Drawing Sheets

U.S. PATENT DOCUMENTS

| | | | |
|---|---|---|---|
| D308,043 S | | 5/1990 | Butler |
| 4,949,919 A | | 8/1990 | Wajnikonis |
| 5,090,636 A | | 2/1992 | Sadowski |
| 5,102,068 A | | 4/1992 | Gratzer |
| 5,119,748 A | | 6/1992 | Nishimura |
| 5,332,177 A | | 7/1994 | Boyle, Jr. |
| 5,348,253 A | * | 9/1994 | Gratzer ................... 244/91 |
| 5,356,094 A | * | 10/1994 | Sylvain ................... 244/49 |
| D363,696 S | | 10/1995 | Kroo et al. |
| 5,492,289 A | | 2/1996 | Nosenchuck et al. |
| 5,503,352 A | | 4/1996 | Eger |
| 5,634,613 A | | 6/1997 | McCarthy |
| 5,836,543 A | | 11/1998 | Kunkel et al. |
| 5,899,409 A | | 5/1999 | Frediani |
| 5,899,410 A | | 5/1999 | Garrett |
| 6,095,457 A | | 8/2000 | Vanmoor |
| 6,098,923 A | | 8/2000 | Peters |
| 6,260,809 B1 | | 7/2001 | Egolf et al. |
| 6,340,134 B1 | | 1/2002 | Meschino |
| 6,474,604 B1 | * | 11/2002 | Carlow ................... 244/198 |
| 6,484,968 B2 | * | 11/2002 | Felker ................... 244/199.4 |
| 6,513,761 B2 | | 2/2003 | Huenecke |
| 6,607,162 B2 | | 8/2003 | Warsop et al. |
| 6,626,398 B1 | | 9/2003 | Cox et al. |
| 6,659,396 B1 | | 12/2003 | August |
| 6,886,778 B2 | | 5/2005 | McLean |
| 6,892,988 B2 | * | 5/2005 | Hugues ................... 244/199.4 |
| D516,994 S | | 3/2006 | Houck, II |
| D526,951 S | | 8/2006 | Houck, II |
| 7,100,867 B2 | | 9/2006 | Houck, II |
| 2002/0092947 A1 | * | 7/2002 | Felker ................... 244/35 R |
| 2003/0201363 A1 | | 10/2003 | Carr |

OTHER PUBLICATIONS

Kroo, Ilan; McMasters, John; Smith, Stephen C.; "Highly Nonplanar Lifting Systems" Sep. 26-28, 1995. Transportation Beyond 2000: Technologies Needed for Engineering Design. pp. 346, 352-367. (These correspond to physical pp. 16, 22-37 of the attached document). Accessed online on Oct. 28, 2008 at http://ntrs.nasa.gov/archive/nasa/casi.ntr.*

Gage, Peter J. "New Approaches to Optimization in Aerospace Conceptual Design" Dec. 1994. Dissertation submitted to the department of Aeronautics and Astronautics of Stanford University. pp. 97-121 (121-145 of the attached document). Accessed online on Oct. 28, 2008 at http://proquest.umi.com/pqdweb?did=742675181&sid=1&Fmt=2&clientId=19649&.*

McMasters, John H et al. NASA Contractor Report 198351: Advanced Configurations for Very Large Subsonic Transport Airplanes, Oct. 1996. pp. 7-22, 30-32, 38-40, 45 and 47-58.*

Nonplanar Wings: Closed Systems [online], undated [retrieved May 31, 2005], 4 pages. Retrieved from the Internet: http://aero.stanford.edu/Reports/Nonplanarwings/ClosedSystems.html.

Kroo, "Nonplanar Wing Concepts for Increased Aircraft Efficiency," *VKI lecture series*, von Karman Institute, Brussels, Belgium, Jun. 2005, 25 pgs.

Bleriot III, c. 1906, 1 page.

* cited by examiner

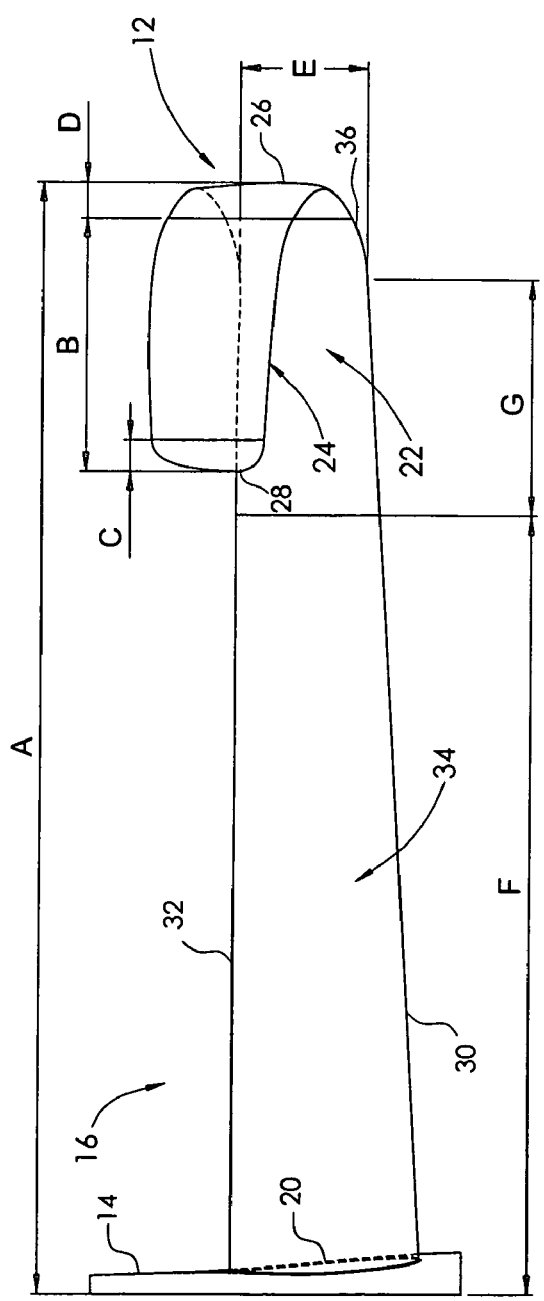
FIG. 2
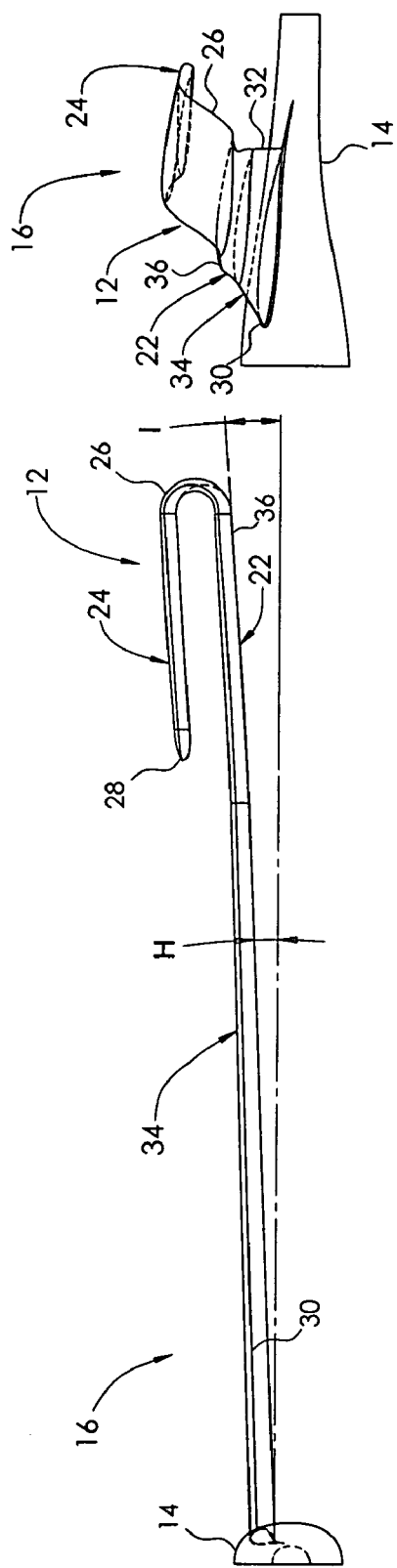
FIG. 4
FIG. 3

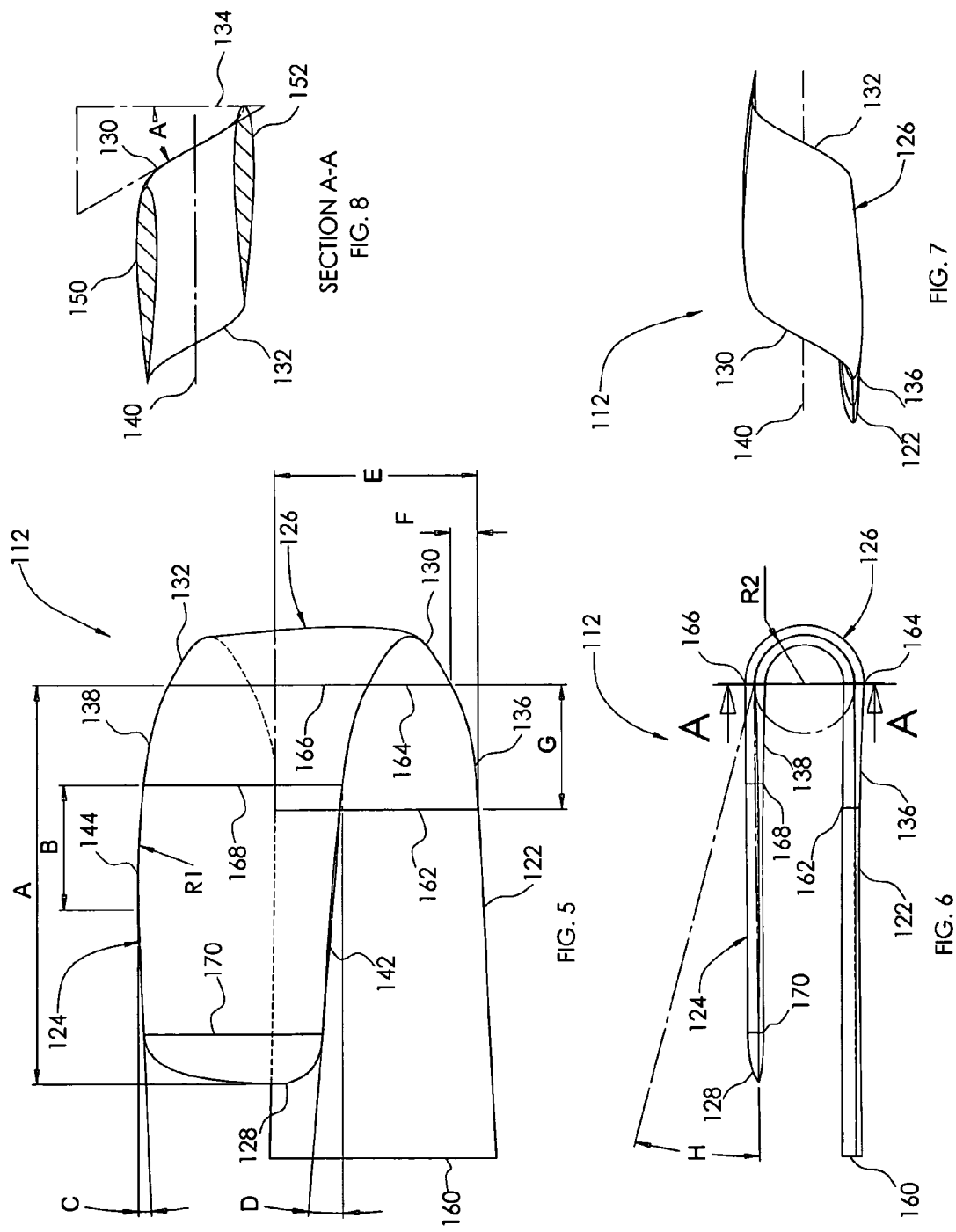

BLENDED WINGLET

BACKGROUND OF THE INVENTION

This invention relates to fluid dynamic force development on moving and nonmoving fluid dynamic structures. The most common fluid dynamic structures to use this invention are airfoils such as wings and propellers and water based lifting and drag structures.

The patents listed below constitute a representative listing of the prior art in this field:

| Pat. No. | Issue Date | Inventor |
| --- | --- | --- |
| 994,968 | Jun. 13, 1911 | Barbaudy |
| 1,050,222 | Jan. 14, 1913 | McIntosh |
| 1,841,921 | Jan. 19, 1932 | Spiegel |
| 1,939,682 | Dec. 19, 1933 | Fleming |
| 2,576,981 | Dec. 4, 1951 | Vogt |
| 2,775,419 | Dec. 25, 1956 | Hlobil |
| 2,805,830 | Sep. 10, 1957 | Zborowski |
| 3,270,988 | Sep. 6, 1966 | Cone |
| 4,050,397 | Sep. 27, 1977 | Vanderleest |
| 4,146,199 | Mar. 27, 1979 | Wenzel |
| 4,714,215 | Dec. 22, 1987 | Jupp et al. |
| 5,102,068 | Apr. 7, 1992 | Gratzer |
| 5,348,253 | Sep. 20, 1994 | Gratzer |
| 6,474,604 | Nov. 5, 2002 | Carlow |

The drag on any fluid dynamic structure occurs due to shape, compressibility, and lift. At speeds below the critical Mach number, drag due to lift is a major factor for any vehicle moving in a fluid. When a wing or a foil moving or immersed in a flowing fluid generates a normal force (lift), the surface facing the direction of the lift force is at a lower pressure and the surface in the opposite direction from the lift force is at a higher pressure. The fluid at the higher pressure moves toward the lower pressure. At the trailing edge of the wing or foil, this pressure differential resolves itself in the wake of the aerodynamic structure and aids in force production. At the unbounded edges of the wing or foil (wingtip or unconnected foil end) the high pressure moves spanwise (normal to the fluid flow and parallel to the wing or foil) and produces a helix-shaped vortex with a centerline parallel to the tangent of the wingtip and the far field fluid flow. The loss of pressure from the high pressure surface and the increase in pressure on the low pressure surface results in decreased lift. The vortex wake results in induced drag proportional to the lift on the wing or foil and defined by:

$$Drag_{induced} = \frac{1}{2} \cdot \rho \cdot V_{inf}^2 \cdot S \cdot \frac{C_L^2}{\pi \cdot k \cdot AR}$$

where
$\rho$ is the density of the fluid
$V_{inf}$ is the freestream velocity of the fluid or wing/foil
S is the area of the wing/foil
$C_L$ is the lift coefficient of the wing/foil
k is the span efficiency factor of the wing/foil
AR is the aspect ratio ($b^2/S$) of the wing/foil and b is the span The span efficiency factor, k, depends on the spanwise load distribution and the configuration of the lifting system. For a planar wing/foil, an elliptic loading is optimum and k=1.0. As can be seen in the equation, increasing the aspect ratio and/or the span efficiency factor of the wing/foil will reduce the induced drag. Aspect ratio is directly related to wing span and chord. Various means have been proposed to increase the apparent (mathematical) aspect ratio and apparent (mathematical) span efficiency factor through the use of tip winglets or end-plates, multiwing configurations of various types, and various forms of arched lifting surfaces either opened or closed. All of these mechanisms endeavor to increase the mathematical aspect ratio and mathematical span efficient factor without actually adding wing span, decreasing chord length, or making the wing more elliptical. Assorted tip devices involving the use of multiple surfaces have been proposed for application to wings and foils. Many of the above are not particularly efficient or useful for various reasons including excessive structural weight, high loads, concomitant drag sources, and operational limitations. Therefore, with the exception of the monoplane with winglets, they find little use today. Several forms of winglets are currently in use for applications where span and operational space may be limited or where existing aircraft configurations can otherwise benefit from their use, but it has not been generally established that winglets are preferable to or more efficient than simple wing span extensions to reduce induced drag. In many cases the relative benefit of winglets is marginal or even cosmetic.

The basic theory behind conventional tip devices on wings and foils is to block the flow of high pressure air from the lower surface to the upper surface at the unbounded termination point (wingtip). Blocking the flow helps reduce vortex formation and decreases the negative effects of the wingtip. Many concepts have been proposed to block the flow of fluid from the high pressure surface to the low pressure surface. The physical manifestations of these concepts are generally termed winglets, wing strakes, end plates, or other similar structures attached to the unbounded end of the wing or foil. Theoretically, if a winglet blocked all the flow from the high to the low pressure at the end of the wing or foil, the wing or foil would approach the efficiency of a two dimensional airfoil of infinite length. The conventional structures mentioned above are somewhat effective and do reduce the flow of fluid from the high pressure side to the low pressure side of the wing or foil, but they do not block all the flow and they do not prevent the formation of a vortex at the termination point, e.g, a wingtip vortex. Therefore, a need remains for improved methods and devices for handling such a vortex and the resulting lift-induced drag.

SUMMARY OF THE INVENTION

The present invention provides, as one aspect thereof, a blended winglet comprising a vertically curved portion having a smooth vertical curvature of 180°±approximately 20° from the plane of the unbounded end of a wing. One embodiment of the invention further comprises a generally planar cap contiguous with the curved portion of the winglet at the end of its curvature away from the wing, the cap having a free inboard end.

According to another aspect of the invention, a curved winglet is attached on one end to the end of a wing and has a free second end, the winglet also having a helical portion extending 180°±approximately 20° about an axis parallel to the direction of normal airflow.

A general object of the present invention is to provide improved methods and devices for reducing lift-induced drag on fluid dynamic structures.

Another object of the present invention is to provide a vortex-shaped wingtip—or other wing-like structure used to produce a normal force (lift)—that directs the vortex flow in such a way that the vortex is dissipated and the energy of the vortex is used to increase lift production. The maximum lift production in the context of airfoils is greater than that of an infinite airfoil with zero induced drag.

Another object of the invention is to improve the normal force creation on a fluid dynamic structure and decrease axial force production.

These and other objects and advantages of the present invention will be more apparent upon reading the following detailed description in conjunction with the accompanying drawings.

BRIEF DESCRIPTION OF THE DRAWINGS

FIG. 2 is a top view of the left wing of the aircraft of FIG. 1.

FIG. 3 is a front end view of the wing of FIG. 2.

FIG. 4 is a left side view of the wing of FIG. 2.

FIG. 5 is a top view of a second embodiment of a winglet according to the present invention on the outboard portion of a horizontal wing having a zero angle of attack.

FIG. 6 is a front end view of the winglet and wing section of FIG. 5.

FIG. 7 is a left side view of the winglet and wing section of FIG. 5.

FIG. 8 is a cross section of the winglet taken along line A-A of FIG. 6.

DESCRIPTION OF PREFERRED EMBODIMENTS

Figure 1:
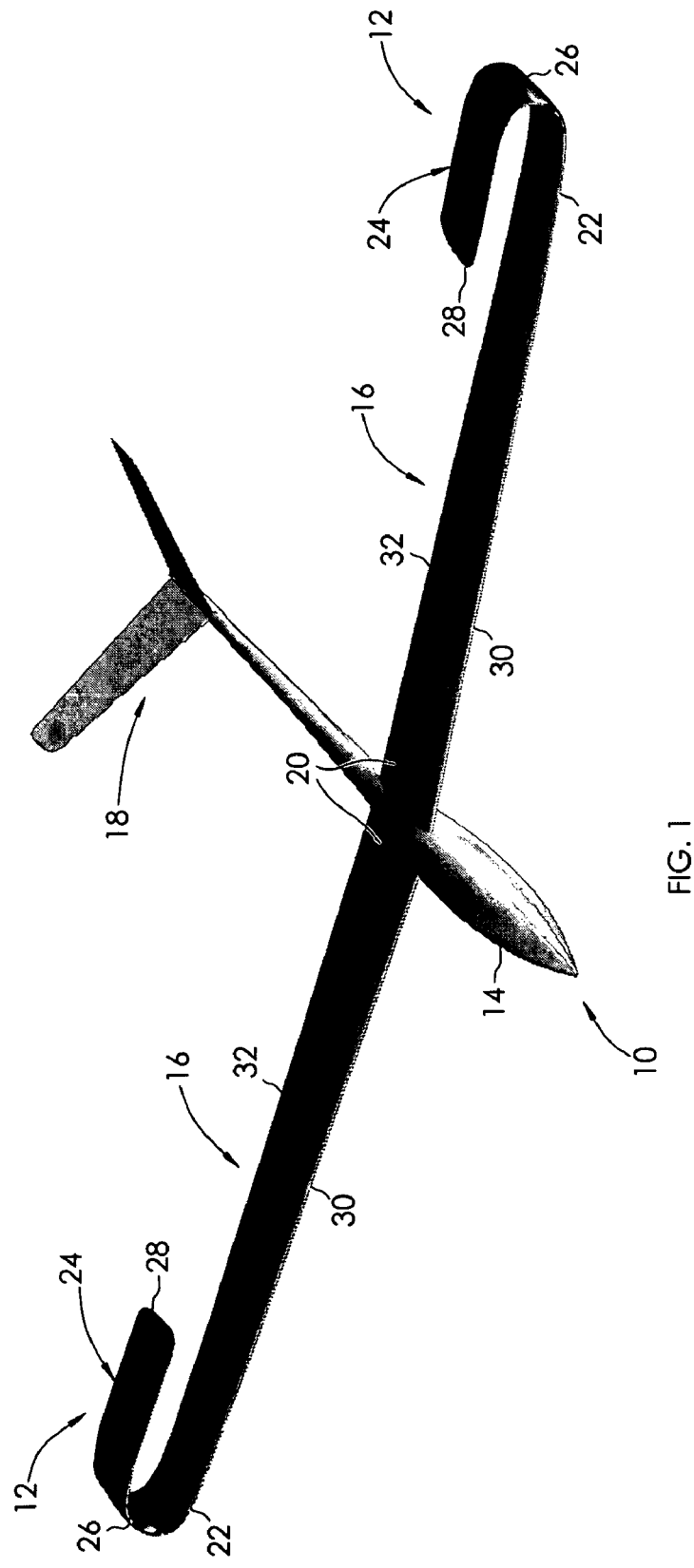
FIG. 1 is a perspective view of one example of an aircraft with a first embodiment of a winglet according to the present invention.
Figure 9:
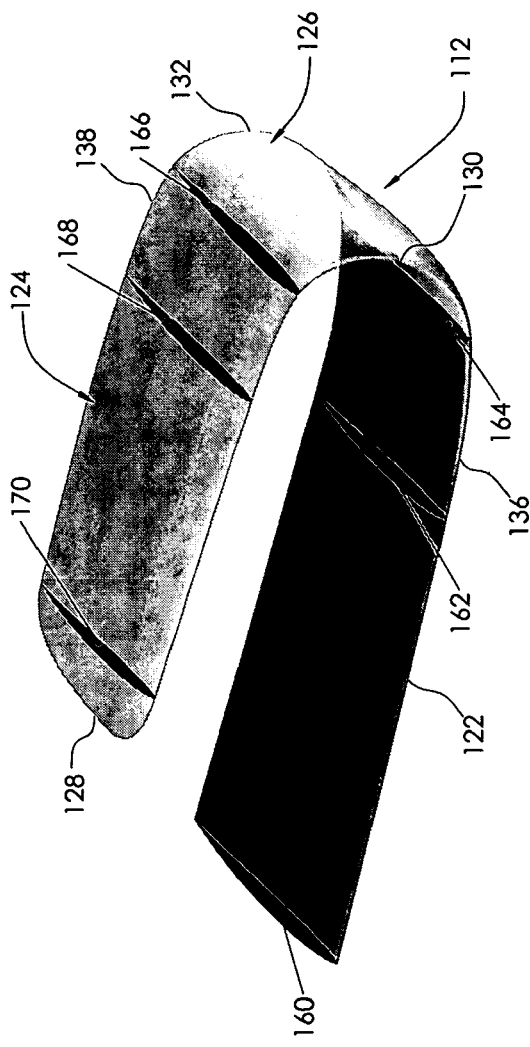
FIG. 9 is a perspective view of the winglet and wing section of FIG. 5.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Three dimensional fluid dynamic structures typically terminate at an end point. In airfoils this termination is the wingtip. As indicated above, when fluid dynamic structures produce normal lift force, fluid flows axially from the high pressure side of the structure to the low pressure structure at the termination of the structure. This axial flow is spanwise to the lifting structure. The flow at the termination of the structure produces a vortex that reduces the lift produced and increases the drag on the structure. The flow of the vortex rotates from the termination point and acquires a helix shape.

The vortex formed at the wingtip is in the shape of a helix of increasing radius. The velocity and force represented by this vortex is significant. The velocity of the vortex is represented mathematically as:

$$V_\Gamma = \frac{V_{inf} \cdot 2 \cdot \sin(\alpha) \cdot c}{\pi \cdot r}$$

where $V_\Gamma$ is the velocity of the vortex $V_{inf}$ is the freestream velocity (fluid or wing/foil)

$\alpha$ is the angle of attack of the wing or foil c is the chord measured from the leading edge of the wing or foil r is the radius of the vortex It can be seen that the vortex velocity is directly proportional to the freestream velocity. This vortex velocity and therefore strength is significant and increases with the fluid or wing/foil velocity and the lift produced. This vortex directly reduces the overall lift of the wing/foil and results in induced drag.

Mathematically, the vortex is similar to a conical helix. If x is the horizontal line parallel to the span of the wing or foil, y is the line normal to the wing or foil, and z is the line along the center of the vortex (tangent to the wing/foil tip and parallel to the fluid flow), a helix can be defined for the vortex by:

$$x = r \cdot \sin(\theta)$$
$$y = r \cdot \cos(\theta)$$
$$z = \frac{P}{2 \cdot \pi} \cdot \theta$$

where x is the coordinate position in space in the x-plane y is the coordinate position in space in the y-plane z is the coordinate position in space in the z-plane r is the radius of the helix P is the distance between adjacent loops of the helix $\theta$ is the angle of the helix In the vortex, P becomes theoretically infinite because the vortex forms in a sheet rather than individual helix loops; therefore z, as reflected in vortex theory becomes infinite and is not a critical variable in this instance of the helix equation. Both x and y are dependent on the radius (r) and the helix angle ($\theta$). The radius can be determined from the equation for the velocity of the vortex ($V_\Gamma$) and is proportional to the chord (c). The helix angle is dependent on the velocity of the fluid flow. Each of these parameters can be determined mathematically and can be found for a specific wing or foil using fluid dynamic computation methods.

FIG. 1 shows one example of an aircraft 10 with a first embodiment of a winglet 12 according to the present invention. The example aircraft includes a fuselage 14, a pair of wings 16 and a V-tail 18, each wing being attached at its root or base 20 to the fuselage and having a smoothly curved winglet 12 attached on its outer end 22. The winglet in this embodiment has a smooth upward curvature of approximately 180° from the plane of the wing end 22 and includes a generally planar cap 24 which is connected on one end to the curved portion 26 of the winglet at the end of its curvature away from the wing and which has a free inboard end or tip 28. The curved portion 26 of the winglet advantageously has a helical shape for redirecting spanwise flow from the wing to the winglet cap, as further described below; the helical portion 26 is also referred to herein as a helix or a half-turn helix.

Referring also to FIGS. 2-4, each wing in this particular example has an aft-swept leading edge 30 and an unswept trailing edge 32, with a dihedral angle of, e.g., 2-2.5° on the inboard portion 34 of the wing (angle H) and a dihedral angle of, e.g., 3.5-4° on the outer wing end 22 (angle I). The wing in this example has an angle of incidence of approximately 5-6°. The outer wing end has the same sweep angle as the inboard portion for a distance G, and thereafter has a curved leading edge 36 as a transition to helix 26, the transition introducing an aft offset at the lower end of the helix as shown in FIG. 2 and also visible in FIG. 4.

FIGS. 5-10 show an embodiment of a winglet 112 according to the present invention on the end 122 of a horizontal wing at a zero angle of attack, and further illustrate the winglet's curvature in a vertical plane. As perhaps best shown in FIG. 6, the vertical curvature in this embodiment starts from the plane of the wing end 122 and ends at a substantially parallel plane above the wing, where the helical portion 126 of the winglet joins the winglet cap 124. A horizontal transition section or joint 136 joins the wing to the lower part of helix 126. Winglet cap 124 includes a free inboard end or tip 128 and also includes a transition section or joint 138 which joins the cap to the upper part of the helix, as also shown in the perspective view of FIG. 9.

FIGS. 5 and 7 together illustrate that the helical portion of the winglet has a leading edge 130 and trailing edge 132 which both follow a helical path. The cross section of FIG. 8 further illustrates that curved portion 126 describes a half turn of a helix, and also illustrates a helix angle of 30° between the leading edge 130 of the helix and a line 134 normal to the longitudinal axis 140 of the helix. It will be appreciated by those skilled in the art that axis 140 is parallel to the plane of wing end 122. Joint 136 lies generally in the plane of wing end 122 and has a curved leading edge which provides a transition to the helix angle from the sweep angle of the wing's leading edge, and which thereby introduces an aft offset for the helix.

The helix angle is preferably in the range of 20-50° for a winglet designed for conditions of incompressible flow. A more preferred range for the helix angle for such a winglet is 25-35°, and the helix angle believed to be optimal for incompressible flow is 30° measured as described above. A higher angle is desirable above 0.3 Mach, up to a maximum of approximately 87°, as a function of the mach number of the fluid flow.

The second factor from the helix equations is the radius of the helix (r). Along the wingtip, the vortex is the greatest at the trailing edge of the wing, that is, at the maximum wingtip chord length. The radius of curvature (R2) of helix 126 is preferably constant and in the range of 0.1-0.5 times the chord of the unbounded wing end 122 at a point adjacent to the winglet, e.g., at or about point 162, and is more preferably approximately one-fourth of the chord of the wing end at such point.

The optimal helix diameter is dependent on the helix angle and the shape of the wing. The greater the velocity and degree of spanwise flow and the longer the mean chord length of the wing, the greater the radius of the helix. Likewise, the lesser the velocity and degree of spanwise flow and the shorter the mean chord length, the smaller the radius of the helix. This relationship is defined by the mean radius of the helix from the velocity of the vortex ($V_r$) and the chord length of the wing.

Figure 10:
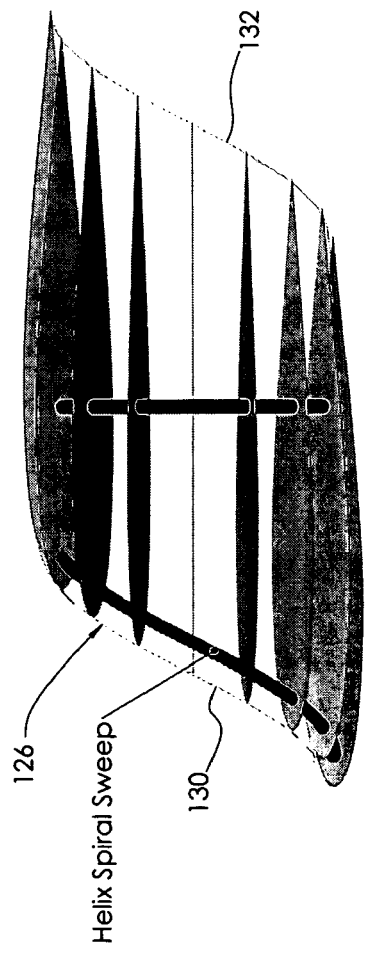
FIG. 10 illustrates the symmetrical airfoil shape of the various radial cross sections throughout the helical portion of the winglet of FIG. 5.

The helical portion of the winglet preferably has a symmetrical airfoil shape, i.e., a symmetrical cross section along any radius through the helix, and preferably a constant symmetrical airfoil throughout the helix, as illustrated by identical cross sections 150 and 152 in FIG. 8. Additional identical cross sections along the helix are shown in FIG. 10, which also illustrates the spiral sweep of the helix. The wing may have a desired normal camber, as indicated at points 160 and 162 in FIGS. 6 and 9, and the camber of joint 136 may vary from normal camber at point 162 to symmetrical camber at point 164. Likewise, cap 124 may have a normal camber at points 168 and 170 in FIG. 9, and a camber varying along joint 138 from normal camber at point 168 to symmetrical camber at point 166. It will be understood that the cross sections at points 166 and 164 are cross sections 150 and 152, respectively (FIG. 8), and are coplanar vertical cross sections. The camber of the cap matches that of the wing in the disclosed embodiment, but the present invention also contemplates differences in those airfoil shapes.

The winglet provides some advantage without a cap, but better performance is achieved with a cap with length A (FIG. 5) on the order of 5% or more of the chord of the wing outer end 122 at a point adjacent to the winglet, e.g., at or about point 162, up to the lesser of approximately (a) four times the chord of the wing end at such point and (b) 50% of the wing length. A more preferred range for cap length A is 1-3 times the chord, and, for the examples illustrated in the drawings, the cap length is 2.05 times the chord of the wing end at point 162.

The cap is preferably horizontal as shown in FIG. 6, for example, but may be oriented at an angle with respect to horizontal as indicated by dimension lines for angle H in the drawing. It is contemplated that the helical portion of the winglet may have 180°±approximately 20° of vertical curvature, and angle H may correspondingly be 0°±approximately 20°. A greater variation than 20° for such vertical curvature and angle H may be suitable for certain applications, but a lesser variation of ±10° is preferred. Although shown parallel to the wing outer end in FIG. 3, the cap is preferably horizontal even for a dihedral wing.

As shown in FIG. 5, the cap may have an aft sweep along its leading edge 142 in the inboard direction from the helix, and a substantially unswept, curved trailing edge 144 with a central radius of curvature (R1) and with a small amount of forward sweep on its inboard end, whereby the chord of the cap is tapered in the inboard direction. One preferred set of angles is 2.4° for angle C and 4.5° for angle D. Other values of angles C and D are contemplated for certain applications, including angles within a range of 0°±5° or more for angle C, and angles within a range of 5°±20° or more, and more preferably a range of 1-10°, for angle D. Alternatively, for certain applications, the leading and trailing edges of the cap may have equal aft sweep.

Referring again to FIGS. 2-4, the particular example illustrated is a modified form of an RNR SBXC glider. The SBXC glider is commercially available from RnR Products, Inc., Milpitas, Calif., and has an SD-2048 airfoil with a base wing span of 170" (wingtip to wingtip) and a 19.8:1 aspect ratio. The following dimensions represent one example set of dimensions for the modified glider as one embodiment of the present invention:

| | |
|---|---|
| A | 70.5" |
| B | 16.1" |
| | (the cap) |
| C | 2" |
| D | 2.3" |
| E | 7.9" |
| F | 49.5" |
| G | 15" |
| H | 2-2.5° |
| I | 3.5-4° |

The embodiment of FIGS. 5-10 may have the following dimensions, as one example:

| | |
|---|---|
| A | 16" |
| B | 5" |
| C | 2.4° |
| D | 4.5° |
| E | 7.9" |
| F | 1.1" |
| G | 5" |
| H | 0° |
| R1 | 68" |
| R2 | 2" |

RG15 airfoils are useful as alternatives to SD-2048 airfoils on small aircraft as described above, both serving as high-efficiency, long-endurance glider airfoils. Larger scale models of the examples just described are also contemplated, as are variations in individual dimensions for particular applications. For example, the size dimensions may be scaled up for aircraft or airfoils 2-3 times the sizes of the examples described, or larger. It is also contemplated to incorporate the novel winglet on powered aircraft, e.g., with a propeller on the forward end of the fuselage driven by a battery-powered electric motor. The battery or batteries may be recharged by solar cells installed on the wings or by an auxiliary motor/ram air generator.

The high pressure air from the bottom surface of the wing is directed along the helix to the winglet cap. The length of the cap surface is designed to produce additional lift by using the high pressure air that would normally form the vortex. The low pressure of the cap balances the high pressure air from the bottom of the wing. The cap length is dependent on the need to balance the high and low pressure such that the result is zero pressure differential. The cap length is preferably less than 3.0 chord ratio as indicated above.

The optimal cap length is dependent on the helix angle, helix height, and the shape of the wing. The greater the pressure differential between the upper and lower wing, the longer the cap length. Increasing helix height and increasing helix angle results in greater pressure dissipation and requires a shorter cap length.

In comparison to the capped helix winglet described above, to reduce the negative effects of the terminal vortex, most devices employed reduce the spanwise flow and/or block the flow of high pressure fluid. These are means to reduce the strength of the vortex. In contrast, the preferred embodiments of this invention are designed to maximize the flow of high pressure fluid and the spanwise flow at the termination point. With the effects of the winglet cap, the end result is the substantial elimination of the vortex.

Certain design features of the lifting structure increase the spanwise flow that results in the terminal point vortex. These design features include wing sweep (an angle to the leading edge greater that 90 degrees to the motion of the fluid dynamic structure), a rounded (in span) leading edge, or flow directors on the fluid dynamic structure.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

The invention claimed is:

1. A blended winglet having a free inboard end having an outer wing end with leading and trailing edges defining a plane, said winglet comprising a vertically curved, helical portion having a smooth vertical curvature of 180°±approximately 20° from the plane of the outer wing end, wherein said helical portion of said winglet has substantially parallel, aft-extending leading and trailing edges and a longitudinal axis substantially parallel to the plane of the wing adjacent the winglet.

2. The winglet of claim 1, further comprising a generally planar cap contiguous with said helical portion of said winglet, said cap extending in the inboard direction away from said helical portion and having a free inboard end.

3. The winglet of claim 2, wherein said helical portion has a leading edge defining a helix angle in the range of 20-50°.

4. The winglet of claim 2, wherein substantially all of said helical portion has a symmetrical airfoil shape with variable thickness along each chord line.

5. The winglet of claim 4, wherein said helical portion has a substantially constant radius of curvature in the range of 0.1-0.5 times the chord of the outer wing end at a point adjacent to said winglet.

6. The winglet of claim 5, wherein said winglet cap has a spanwise length in the range of 1-3 times said chord.

7. The winglet of claim 1, wherein said helical portion has a leading edge defining a helix angle in the range of 20-50°.

8. The winglet of claim 7, wherein said helix angle is approximately 30°.

9. The winglet of claim 1, wherein substantially all of said helical portion has a symmetrical airfoil shape with variable thickness along each chord line.

10. The winglet of claim 1, wherein said helical portion has a substantially constant radius of curvature in the range of 0.1-0.5 times the chord of the outer wing end at a point adjacent to said winglet.

11. The winglet of claim 10, wherein the radius of curvature of said helical portion is approximately one-fourth of the chord of the outer wing end at a point adjacent to said winglet.

12. The winglet of claim 1, wherein said winglet cap has a spanwise length in the range of 1-3 times the chord of the outer wing end at a point adjacent to said winglet.

13. A blended winglet for a wing having an outer wing end with leading and trailing edges defining a plane, said winglet comprising:
   a vertically curved helical portion having a smooth vertical curvature of 180°±approximately 20° from the plane of the outer wing end wherein said helical portion of said winglet has substantially parallel, aft-extending leading and trailing edges and a longitudinal axis substantially parallel to the plane of the wing adjacent the winglet; and
   a generally planar cap contiguous with said curved portion of said winglet at the end of its curvature away from the wing, said cap extending in the inboard direction away from said curved portion and having a free inboard end.

14. The winglet of claim 13, wherein said cap has a leading edge which is aft of the leading edge of the wing adjacent its wingtip, and wherein said cap is within approximately 20° of parallel to said plane of said wing end.

15. The winglet of claim 14, wherein said curved portion of said winglet is helical with a longitudinal axis substantially centerline parallel to the plane of the wing adjacent the winglet.

16. A blended winglet for a wing having an outer wing end with leading and trailing edges defining a plane, said winglet comprising:

a vertically curved, helical portion having a smooth vertical curvature of 180°±approximately 20° from the plane of the outer wing end; and a generally planar cap contiguous with said helical portion of said winglet and above the wing, said cap having a free inboard end;

wherein said helical portion has a centerline parallel to the plane of the wing adjacent the winglet, and a leading edge defining a helix angle in the range of 20-50°;

wherein substantially all of said helical portion has a symmetrical airfoil shape;

wherein said helical portion has a substantially constant radius of curvature in the range of 0.1-0.5 times the chord of the outer wing end at a point adjacent to said winglet;

wherein said winglet cap has a length in the range of 1-3 times said chord;

wherein said helical portion has a substantially constant chord; and wherein said cap has a leading edge with approximately 1-10° of aft sweep and a relatively unswept trailing edge.

17. The winglet of claim 16, wherein the vertical curvature of said helical portion of said winglet from the plane of the wing adjacent the wingtip is approximately 180°.

18. The winglet of claim 17, wherein said helix angle is approximately 30°.

19. The winglet of claim 18, wherein the radius of curvature of said helical portion is approximately one-fourth of the chord of the outer wing end at a point adjacent to said winglet.

20. The winglet of claim 19, wherein the length of said winglet cap is approximately twice said chord.

21. A wing with a winglet for beneficially redirecting and reusing spanwise flow, comprising:

a wing having a leading edge, a trailing edge and an outer wing end; and a curved winglet attached on one end to said outer wing end and having a free second end, said winglet having a helical portion with a longitudinal axis substantially parallel to the angle of attack of the wing, said helical portion having substantially parallel, aft-extending leading and trailing edges extending 180°±approximately 20° about said axis.

22. The wing of claim 21, further comprising a generally planar winglet cap connected between said helical portion and said free end of said winglet, said cap extending in the inboard direction away from said helical portion.

23. The wing of claim 22, wherein said helical portion has parallel leading and trailing edges defining a helix angle of approximately 30°.

24. The wing of claim 23, wherein said wing and said winglet cap have a normal camber and substantially all of said helical portion of said winglet has a symmetrical airfoil shape with variable thickness along each chord line.

25. The wing of claim 24, wherein said helical portion has a substantially constant radius of curvature of approximately one-fourth the chord of said outer wing end at a point adjacent to said winglet.

26. The wing of claim 25, wherein said winglet cap has a spanwise length of approximately twice said chord.

27. The wing of claim 21, wherein said helical portion has parallel leading and trailing edges defining a helix angle of approximately 30°.

28. The wing of claim 21, wherein said wing and said winglet cap have a normal camber and substantially all of said helical portion of said winglet has a symmetrical airfoil shape with variable thickness along each chord line.

29. The wing of claim 21, wherein said helical portion has a substantially constant radius of curvature of approximately one-fourth the chord of said outer wing end at a point adjacent to said winglet.

30. A wing with a winglet for beneficially redirecting and reusing spanwise flow, comprising:

a wing having a leading edge, a trailing edge and an outer wing end;

a curved winglet attached on one end to said outer wing end and having a free second end, said winglet having a helical portion with a longitudinal axis substantially parallel to the angle of attack of the wing, said helical portion extending 180°±approximately 20° about said axis and having parallel leading and trailing edges defining a helix angle of approximately 30°, said helical portion having a substantially constant radius of curvature of approximately one-fourth the chord of said outer wing end at a point adjacent to said winglet; and a generally planar winglet cap connected between said helical portion and said free end of said winglet;

wherein said wing and said winglet cap have a normal camber and substantially all of said helical portion of said winglet has a symmetrical airfoil shape;

wherein said winglet cap has a length of approximately twice said chord;

wherein said helical portion has a substantially constant chord; and wherein said winglet cap has a leading edge with approximately 1-10° of aft sweep and a relatively unswept trailing edge.

31. The wing of claim 30, wherein said wing has an aspect ratio in the range of 15:1 to 30:1.

32. The wing of claim 31, wherein the length of said wing from its root to its tip is in the range of 5-20 feet.

33. The wing of claim 32, wherein said wing has an airfoil shape selected from the group consisting of the RG15 family of airfoils and SD-2048 airfoils.

34. The wing of claim 33, wherein said winglet cap is substantially horizontal in the spanwise direction in normal flight.

* * * * *